United States Patent [19]

Pruett et al.

[11] Patent Number: 4,661,566

[45] Date of Patent: Apr. 28, 1987

[54] UV-ABSORBING CONDENSATION POLYMERIC COMPOSITION

[75] Inventors: Wayne P. Pruett; Richard H. S. Wang, both of Kingsport; Samuel D. Hilbert, Jonesborough; Max A. Weaver, Kingsport, all of Tenn.

[73] Assignee: Eastman Kodak Company, Rochester, N.Y.

[21] Appl. No.: 826,645

[22] Filed: Feb. 6, 1986

[51] Int. Cl.[4] .................. C08G 63/46; C08G 63/62
[52] U.S. Cl. ................. 525/445; 525/462; 525/467; 525/468; 528/199; 528/274
[58] Field of Search ............ 525/445, 467, 462, 468; 528/274, 199

[56] References Cited

U.S. PATENT DOCUMENTS 4,338,247 7/1982 Zannucci et al. ............ 525/445
4,377,669 3/1983 Zweifel et al. ............... 525/445

Primary Examiner—Harold D. Anderson
Attorney, Agent, or Firm—Donald W. Spurrell; J. Frederick Thomsen; W. P. Heath, Jr.

[57] ABSTRACT

Compositions comprising polyester or polycarbonate having reacted therein a total of from about 1.0 to about 5,000 parts by weight per million parts by weight of polyester of at least one UV absorbing compound of the formula

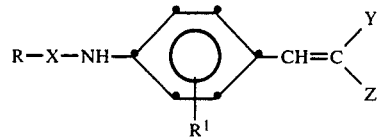

wherein R is alkyl or the like, X is carbonyl or sulfonyl, $R^1$ is hydrogen or a substituent, and Y and Z are hydrogen or substituents such as cyano or alkoxycarbonyl, with the provision that at least one of R, $R^1$, Y, and Z is, or forms part of, or contains one or more reactive groups capable of undergoing a condensation reaction under polyester forming conditions, such that the UV absorbing compound is reacted into the polymer. The compound has a maximum light absorbance within the range of from about 320 nm to about 380 nm, which is nonextractable from the polyester and stable under the polyester processing conditions, for imparting UV screening properties to the polymer. Many products such as fruit juices, soft drinks, wines, food products, cosmetics and shampoos are deleteriously affected by UV light when packaged in clear plastic containers which pass significant portions of the available light at any wavelength from approximately 250 to 390 nm. By use of the present compounds polymeric containers can be manufactured which absorb these harmful wavelengths and therefore reduce or eliminate the UV light degradation of products packaged therein. A further advantage of the present polymeric compositions is that conventional polyester dyes and other additives such as pigments, fillers, brighteners and the like may be incorporated therein, and the UV screening properties of the methine compounds impart significant stabilization to both the polyester and the dyes.

8 Claims, No Drawings

UV-ABSORBING CONDENSATION POLYMERIC COMPOSITION

This invention concerns polymeric compositions comprising condensation polymers including polyesters and polycarbonates having certain UV (ultraviolet light) absorbing methine compounds reacted thereinto for imparting UV screening properties to the polymer. Many products such as fruit juices, soft drinks, wines, food products, cosmetics and shampoos are deleteriously affected by UV light when packaged in clear plastic containers which pass significant portions of the available light at any wavelength from approximately 250 to 390 nm. By use of the present compounds polymeric containers can be manufactured which absorb these harmful wavelengths and therefore reduce or eliminate the UV light degradation of products packaged therein.

A further advantage of the present polymeric compositions is that conventional polyester dyes and other additives such as pigments, fillers, brighteners and the like may be incorporated therein, and the UV screening properties of the methine compounds impart significant stabilization to both the polyester and the dyes.

The present compounds are thermally stable and nonsublimable at the polymer preparation and processing temperature, are fast to light and are nonextractable from the polymers, thus rendering the polymers particularly suitable for use as beverage bottles and food, pharmaceutical and cosmetic containers. The methine compounds are useful in total concentrations given herein in parts per million (ppm) ranging from about 1.0 to about 5,000, preferably 2.0 to about 1,500 (parts by weight of methine compound per million parts by weight of condensation polymer).

The present polymers are linear, thermoplastic, molding or fiber grade having an I.V. of from about 0.4 to about 1.2, and preferably are polyesters wherein the acid moiety is comprised of at least about 50 mol % terephthalic acid residue, and the glycol moiety of at least about 50 mol % ethylene glycol or 1,4-cyclohexanedimethanol residue, and containing a total of from about 2 to 1,500 ppm of one or more of the reacted methine compounds.

In accordance with the present invention, certain methine compounds defined below are reacted with the condensation polymer and impart thereto the property of ultraviolet or visible light absorption generally with a maximum absorbance within the range of from about 320 nm to about 380 nm. These compounds preferably have molecular weights of from about 200 to about 600 although lower and higher molecular weight compounds are also operable. These compounds contain various condensable groups such as acid or ester and amino which condense into the polymer chain. As aforesaid, these compounds are thermally stable at polymer processing conditions, which includes polycondensation temperatures of up to about 300° C. which are employed, for example, in the preparation of polyesters such as poly(ethylene terephthalate) and copolymers of poly(ethylene terephthalate) and poly(1,4-cyclohexylenedimethylene terephthalate).

The present invention is defined in its broad embodiment as a composition comprising molding or fiber grade polyester or polycarbonate having reacted therein a total of from 1.0 to about 5,000 ppm, of at least one UV-absorbing compound of the formula

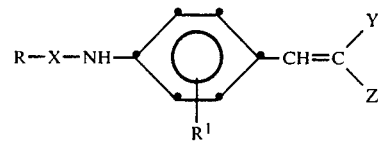

absorbing in the range of from about 320 nm to about 380 nm, and being nonextractable from said polymer and stable under the polymer preparation and processing conditions wherein in the above formula:

X is carbonyl or sulfonyl;

R is selected from alkyl, substituted alkyl, aryl, substituted aryl, cycloalkyl, substituted cycloalkyl, furanyl, thienyl, alkylamino, substituted alkylamino, dialkylamino, substituted dialkylamino, N-alkyl-N-arylamino, substituted N-alkyl-N-arylamino, alkoxy, substituted alkoxy, aryloxy, substituted aryloxy, cycloalkoxy and substituted cycloalkoxy, and when X is carbonyl, R may also be hydrogen;

$R^1$ is hydrogen or 1-3 groups selected from alkyl, substituted alkyl, alkoxy, substituted alkoxy, and halogen;

Y is selected from hydrogen, alkoxycarbonyl, aryloxycarbonyl, cycloalkyloxycarbonyl, carbamyl, N-alkylcarbamyl, N,N-dialkylcarbamyl, N-alkyl-N-arylcarbamyl, N-aryloxycarbamyl, N-cycloalkylcarbamyl, alkanoyl, aroyl, aryl, cyano, benzimidazolyl, benzoxazolyl, and benzothiazolyl; and Z is selected from hydrogen, alkoxycarbonyl, substituted alkoxycarbonyl, aryloxycarbonyl, substituted aryloxycarbonyl, cycloalkoxycarbonyl, substituted cycloalkoxycarbonyl, and cyano;

with the provision that at least one of R, $R^1$, Y, and Z is, or forms part of, or contains one or more reactive groups capable of undergoing a condensation reaction under polyester forming conditions, such that the UV absorbing compound is reacted into the polymer. Such reactive groups include carboxyl, amino, chlorocarbonyl, hydroxyl, alkoxycarbonyl, aryloxycarbonyl, cycloalkoxycarbonyl, and alkyloxycarbonyl. The alkyl, aryl, and cycloalkyl moieties of these groups may be substituted with groups which do not interfere with the transesterification or polycondensation reactions.

In preferred embodiments, R is selected from cycloalkyl; cycloalkyl substituted with one or two of alkyl, alkoxy or halogen; phenyl; phenyl substituted with 1-3 of alkyl, alkoxy, halogen, alkanoylamino, or cyano; straight or branched lower alkenyl; straight or branched alkyl and such alkyl substituted with 1-3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamoyl; vinylsulfonyl; acrylamido; sulfamyl; benzoylsulfonicimido; alkylsulfonamido; phenylsulfonamido; alkenylcarbonylamino; groups of the formula

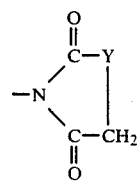

wherein Y is —NH—,

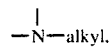

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

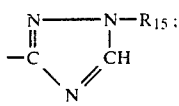

—NHXR$_{16}$; —CONR$_{15}$R$_{15}$; and —SO$_2$NR$_{15}$R$_{15}$; wherein R$_{15}$ is selected from H, aryl, alkyl, and alkyl substituted with halogen, phenoxy, aryl, —CN, cycloalkyl, alkylsulfonyl, alkylthio, or alkoxy; X is —CO—, —COO—, or —SO$_2$—; R$_{16}$ is selected from alkyl and alkyl substituted with halogen, phenoxy, aryl, cyano, cycloalkyl, alkylsulfonyl, alkylthio, and alkoxy; and when X is —CO—, R$_{16}$ also can be hydrogen, amino, alkenyl, alkylamino, dialkylamino, arylamino, aryl, or furyl; alkoxy; alkoxy substituted with cyano or alkoxy; phenoxy; or phenoxy substituted with 1-3 of alkyl, alkoxy, or halogen.

In all of the above definitions the alkyl or divalent aliphatic moieties of the various groups contain from 1-10, preferably 1-6 carbons, straight or branched chain.

Any of a large variety of substituents which do not interfere with the condensation reaction may be substituted on the alkyl, divalent aliphatic, aryl and cycloalkyl moieties of the above defined R$^1$, Y and Z groups including, where appropriate, alkyl, aryl, cycloalkyl, alkoxy, halogen, hydroxy, alkoxycarbonyl, cyano or the like.

A most preferred polyester composition contains the reaction residue of the compound

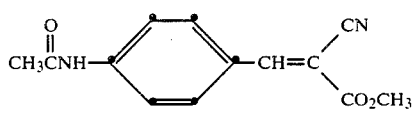

in from about 10 to about 300 ppm.

The nonextractabilities of the present methine compounds are determined as follows:

Extraction Procedure

All extractions are done in glass containers with distilled solvents under the time and temperature conditions described below. The sample form is ½ inch × 2½ inch segments cut from the cylindrical side wall portion of 2-liter bottles. All samples are washed with cold solvent to remove surface contaminants and are exposed using 200 ml. solvent/100 in.$^2$ surface area (2 ml/in.$^2$).

Solvent blanks are run under the same extraction conditions without polymer. In most cases samples are extracted, spiked, and analyzed in duplicates.

Extraction Conditions

1. Water. The samples at room temperature are added to solvent and heated at 250° F. for two hours. Half of the samples are then analyzed and the remainder are placed in a 120° F. oven for 30 days.

2. 50% Ethanol/Water. The samples at room temperature are added to the solvent at room temperature, placed in an oven at 120° F. and analyzed after 24 hours and 30 days.

3. Heptane. The samples at room temperature are added to solvent at room temperature and heated at 150° F. for 2 hours. Part of the samples are cooled to room temperature and analyzed spectrophotometrically and the remainder are allowed to age at 120° F. for 30 days before analysis.

4. Any suitable analytical technique and apparatus may be employed to determine the amount of methine compound extracted from the polymer. The extractability of the present compounds are found to be essentially nonexistent.

The types of polyesters useful in this invention for reaction with the methine compounds are those produced by conventional techniques using one or more diols and one or more dicarboxylic acids. Typical of these polyesters are those disclosed, for example, in U.S. Pat. No. 4,359,570 incorporated herein by reference.

The diol components of the polyester are selected, for example, from ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, X,8-bis(hydroxymethyl)tricyclo-[5.2.1.0]-decane wherein X represents 3, 4, or 5, and diols containing one or more oxygen atoms in the chain, e.g., diethylene glycol, triethylene glycol, dipropylene glycol, tripropylene glycol and the like containing from about 2 to about 18, preferably 2 to 12 carbon atoms in each aliphatic moiety. Cycloaliphatic diols can be employed in their cis or trans configuration or as mixtures of both forms.

The acid components (aliphatic, alicyclic, or aromatic dicarboxylic acids) of the polyester are selected, for example, from terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, and the like. In the polymer preparation, it is often preferable to use a functional acid derivative thereof such as the dimethyl, diethyl, or dipropyl ester of the dicarboxylic acid. The anhydrides of these acids also can be employed.

The preferred copolyesters are especially useful for making blow molded bottles or containers for beverages, and for molded food packages and the like. In this regard, certain of these copolyesters are color, I.V., and heat distortion or "hot fill" stable at temperatures of up to about 100° C. when properly heat set, and molded articles therefrom exhibit good thin wall rigidity, excellent clarity and good barrier properties with respect to water and atmospheric gases, particularly carbon dioxide and oxygen.

In regard to products having the "hot fill" stability, the most preferred polyesters therefor comprise poly(ethylene terephthalate) and this polymer modified with up to about 5 mole % of 1,4-cyclohexanedimethanol, wherein the polymers have been sufficiently heat set and oriented by methods well known in the art to give a desired degree of crystallinity. By definition, a polymer is "hot fill" stable at a prescribed temperature when less than 2% change in volume of a container manufactured therefrom occurs upon filling the same with a liquid at that temperature. For the particular application of blow-molded beverage bottles, these most preferred polyesters have an I.V. of 0.65 to 0.85, and a Tg of >70° C., and film sections cut from the bottle have a Water Vapor Transmission Rate of 1.5 to 2.5 g. mils/100 in.$^2$-24 hrs., a $CO_2$ Permeability of 20-30 cc. mils/100 in.$^2$-24 hrs.-atm., and an $O_2$ Permeability of 4-8 cc. mils/100 in.$^2$-24 hrs.-atm. The Tg is determined by Differential Scanning Calorimetry at a scan rate of 20 Centigrade Degrees/min., the $O_2$ Permeability by the standard operating procedure of a MOCON OXTRAN 100 instrument of Modern Controls, Inc., of Elk River, Minn., and the $CO_2$ Permeability by the standard operating procedure of a MOCON PERMATRAN C II, also of Modern Controls.

The methine compounds useful herein are generally prepared by reacting the appropriate aldehyde with an active methylene compound, i.e.,

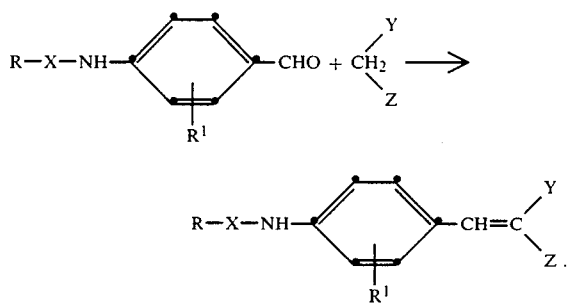

Alcohols serve as convenient solvents for the reactions, which are carried out in the presence of basic catalysts such as piperidine and sodium acetate.

EXAMPLE 1

Preparation of methyl 2-Cyano-3-(4-Acetamidophenyl)propenoate

A mixture of p-acetamidobenzaldehyde (4.08 g, 0.025 m), methyl cyanoacetate (2.50 g, 0.026 m), methanol (75 ml) and piperidine (10 drops) is heated and stirred at reflux for 0.5 hour. The reaction mixture is cooled and the pale yellow solid collected by filtration and dried in air. Recrystallization of the product from 50/50 isopropanol/toluene (by volume) gives 4.5 g of pure UV absorber product by mass spectrum analysis which has an absorption maximum at 346 nm in methylene chloride.

EXAMPLE 2

Preparation of Polymer Containing UV Absorber

For the preparation of poly(ethylene terephthalate) reacted with methyl 2-cyano-3-(4-acetamidophenyl)-propenoate, the following compounds are placed in a 500 ml, three-necked, round-bottom flask;

97 g (0.5 mol) dimethyl terephthalate,
62 g (1.0 mol) ethylene glycol,
0.064 ml of a n-butanol solution of acetyl-trilsopropyl titanate which contains 0.00192 g Ti,
1.1 ml of an ethylene glycol solution of Mn $(OCOCH_3)_2.4H_2O$ which contains 0.0053 g Mn,
2.3 ml of an ethylene glycol solution of Sb $(OCOCH_2)_3$ which contains 0.0216 g Sb, and
0.64 ml of an ethylene glycol solution of Co(O-$COCH_3)_2.4H_2O$ which contains 0.0072 g Co.

The flask is equipped with a nitrogen inlet, stirrer, vacuum outlet, and condensing unit. The flask and contents are heated at 200° C. in a Belmont metal bath for 60 minutes and then at 210° C. for 75 minutes with a nitrogen sweep over the reaction mixture. 1.57 Ml of an ethylene glycol slurry of Zonyl A which contains 0.012 g phosphorus is then added. The temperature of the bath is increased to 230° C. and 0.0384 g (400 ppm) methyl-2-cyano-3-(4-acetamidophenyl)propenoate are added to the flask. Five minutes after this addition, a vacuum with a slow stream of nitrogen bleeding in the system is applied over a five-minute period until the vacuum is reduced to 200 mm Hg. The flask and contents are heated at 230° C. under this vacuum for 25 minutes. The metal bath temperature is increased to 270° C. the vacuum then reduced slowly to 100 mm Hg and the flask and contents heated at 270° C. under said vacuum for 30 minutes. The metal bath temperature is increased to 285° C., the vacuum slowly reduced to 4.5 mm Hg and the flask and contents heated at this temperature and vacuum for 25 minutes. The vacuum is reduced to 0.2 mm Hg and polycondensation continued for 40 minutes. The flask is removed from the metal bath and allowed to cool in nitrogen atomosphere while the polymer crystallizes. The resulting polymer is yellow colored and has an inherent viscosity of 0.58 measured as described below. An amorphous 13 mil thick film molded from this polymer transmits less than 10% light from 250 to 390 nm whereas a 13 mil film prepared from a like polyester without the reacted absorber transmits less than 10% light from 250 nm to only 320 nm.

Other exemplary compounds useful for reaction with the polyesters in accordance with the present invention are listed in the table below.

TABLE 1

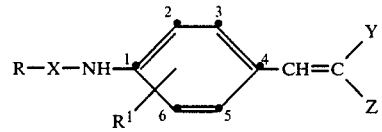

| Example No. | R | R$^1$ | X | Y | Z |
|---|---|---|---|---|---|
| 3 | $C_2H_5-$ | H | CO | $CO_2CH_3$ | CN |
| 4 | $(CH_3)_3C-$ | H | CO | $CO_2C_2H_5$ | CN |
| 5 | $C_6H_5-$ | 5-$CH_3$ | CO | $CO_2CH(CH_3)_2$ | CN |
| 6 | $C_6H_{11}-$ | 3,5-di-$CH_3$ | CO | $CO_2CH_2CH_2CH_3$ | CN |
| 7 | $CH_3OCH_2CH_2-$ | 2,5-di-$OCH_3$ | CO | $CO_2CH_2CH_2OH$ | CN |
| 8 | $ClCH_2CH_2CH_2-$ | 2,5-di-Cl | CO | $CO_2CH_2CH_2OCH_3$ | CN |
| 9 | $C_6H_5CH_2-$ | 2-$CH_3$ | CO | $CO_2CH_2CH_2CH_3$ | CN |

TABLE 1-continued

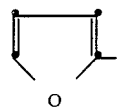

| Example No. | R | R¹ | X | Y | Z |
|---|---|---|---|---|---|
| 10 | $C_6H_5OCH_2-$ | H | CO | $CO_2CH_3$ | CN |
| 11 | H— | H | CO | $CO_2CH_3$ | $CO_2CH_3$ |
| 12 | 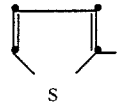 | H | CO | $CO_2C_2H_5$ | $CO_2C_2H_5$ |
| 13 | 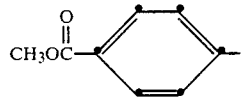 | H | CO | $CO_2CH_3$ | $CO_2CH_3$ |
| 14 | $C_2H_5NH-$ | H | CO | $CO_2CH_3$ | $CO_2CH_3$ |
| 15 | $(CH_3CH_2CH_2CH_2)_2N-$ | H | CO | $CO_2CH_3$ | CN |
| 16 | $C_6H_5NH-$ | H | CO | $COC(CH_3)_3$ | $CO_2CH_3$ |
| 17 | $C_6H_5(CH_3)N-$ | H | CO | $CO_2CH_3$ | CN |
| 18 | $C_2H_5O-$ | H | CO | $CO_2CH_3$ | CN |
| 19 | $CH_3CH_2CH_2CH_2O-$ | H | CO | $CO_2CH_3$ | $CO_2CH_3$ |
| 20 | $C_6H_5O-$ | H | CO | $CO_2CH_3$ | $CO_2CH_3$ |
| 21 | $C_6H_{10}-O-$ | H | CO | $CO_2CH_2CH_2CN$ | $CO_2CH_2CH_2CN$ |
| 22 | 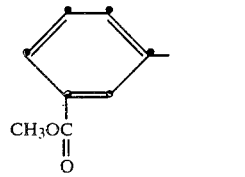 | H | CO | $CO_2CH_3$ | CN |
| 23 | 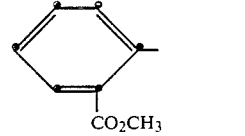 | H | CO | CN | CN |
| 24 | 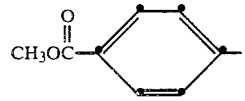 | H | CO | CN | $CO_2CH_3$ |
| 25 | $CH_3-$ | H | $SO_2$ | CN | $CO_2CH_3$ |
| 26 | $C_6H_5-$ | H | $SO_2$ | $CO_2C_6H_{11}$ | $CO_2C_6H_{11}$ |
| 27 | $C_4H_9-n$ | H | $SO_2$ | $CO_2C_6H_4-p-Cl$ | $CO_2C_6H_4-p-Cl$ |
| 28 | $(C_2H_5)_2N-$ | H | $SO_2$ | $CO_2C_6H_4-p-CH_3$ | $CO_2C_6H_4-p-CH_3$ |
| 29 | $CH_3OCH_2CH_2-$ | H | $SO_2$ | $CO_2CH_2CH_2C_6H_5$ | $CO_2CH_2CH_2C_6H_5$ |
| 30 | $C_6H_{11}-$ | H | $SO_2$ | $CO_2CH_2CH_2OC_2H_5$ | CN |
| 31 | 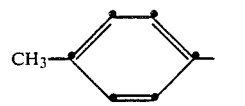 | H | $SO_2$ | $CO_2CH_2CH_2OH$ | $CO_2CH_2CH_2OH$ |
| 32 |  | H | $SO_2$ | $CO_2CH_3$ | $CO_2CH_3$ |

TABLE 1-continued

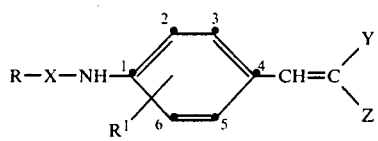

| Example No. | R | $R^1$ | X | Y | Z |
|---|---|---|---|---|---|
| 33 | (phenyl with CO₂CH₃) | H | SO₂ | (benzimidazole group: N=C—NH fused to benzene) | CN |
| 34 | (phenyl with CO₂CH₃ and CO₂CH₃) | H | SO₂ | CN | CN |
| 35 | (phenyl with HOC(=O)—) | H | SO₂ | CO₂—(thiophene)—CH₃ | CO₂—(thiophene)—CH₃ |
| 36 | HOCH₂CH₂CH₂CH₂— | H | CO | CO₂NH₂ | CN |
| 37 | HOCH₂— | H | CO | CONHC₂H₅ | CN |
| 38 | (phenyl with CO₂CH₃) | H | SO₂ | CONHC₆H₅ | CN |
| 39 | (phenyl with CO₂CH₃) | H | SO₂ | CON(C₂H₅)₂ | CN |
| 40 | (phenyl with CO₂CH₃) | H | SO₂ | CONH—(phenyl)—OCH₃ | CN |
| 41 | (phenyl with CO₂CH₃) | H | SO₂ | CONH—(phenyl)—C₂H₄OH | CN |
| 42 | (phenyl with CO₂CH₃) | H | SO₂ | CON(CH₃)C₆H₅ | CN |

TABLE 1-continued $$R-X-NH-\underset{R^1}{\overset{2}{\underset{6}{\bigcirc}}\overset{3}{\underset{5}{}}}^4-CH=C\overset{Y}{\underset{Z}{}}$$

| Example No. | R | R¹ | X | Y | Z |
|---|---|---|---|---|---|
| 43 | (phenyl with CO₂CH₃) | H | SO₂ | CONHC₆H₁₁ | CN |
| 44 | (phenyl with CO₂CH₃) | H | SO₂ | COC₆H₅ | CN |
| 45 | (phenyl with CO₂CH₃) | H | SO₂ | C₆H₅ | CN |
| 46 | (phenyl with CO₂CH₃) | H | SO₂ | (benzoxazolyl) | CN |
| 47 | (phenyl with CO₂CH₃) | H | SO₂ | (benzothiazolyl) | CN |
| 48 | (phenyl with CO₂CH₃) | H | SO₂ | (benzoxazolyl) | CO₂C₂H₅ |

The inherent viscosities (I.V.) of each of the copolyesters herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25°\,C} = \frac{\ln \frac{t_s}{t_o}}{C}$$

where:

($\eta$) = Inherent viscosity at 25° C. at a polymer concentration of 0.5 g./100 ml. of solvent;

ln = Natural logarithm;
$t_s$ = Sample flow time;
$t_o$ = Solvent-blank flow time; and
C = Concentration of polymer in grams per 100 ml. of solvent = 0.50.

This invention has been described in detail with particular reference to preferred embodiments thereof, but it will be understood that variations and modifications can be effected within the spirit and scope of the invention.

We claim:

1. A composition comprising polyester or polycarbonate having reacted therein a total of from about 1.0 to about 5,000 parts by weight per million parts by weight of polymer of at least one UV absorbing compound of the formula

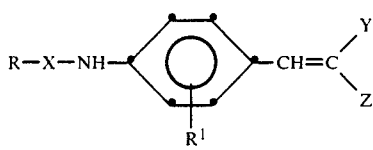

having a maximum light absorbance within the range of from about 320 nm to about 380 nm, which is nonextractable from the polyester or polycarbonate and stable under the polyester processing conditions, wherein:

X is carbonyl or sulfonyl;

R is selected from alkyl, substituted alkyl, aryl, substituted aryl, cycloalkyl, substituted cycloalkyl, furanyl, thienyl, alkylamino, substituted alkylamino, dialkylamino, substituted dialkylamino, N-alkyl-N-arylamino, substituted N-alkyl-N-arylamino, alkoxy, substituted alkoxy, aryloxy, substituted aryloxy, cycloalkoxy or substituted cycloalkoxy, and when X is carbonyl, R is further selected from hydrogen;

$R^1$ is hydrogen or 1-3 groups selected from alkyl, substituted alkyl, alkoxy, substituted alkoxy, or halogen;

Y is selected from hydrogen, alkoxycarbonyl, aryloxycarbonyl, cycloalkyloxycarbonyl, carbamyl, N-alkylcarbamyl, N,N-dialkylcarbamyl, N-alkyl-N-arylcarbamyl, N-aryloxycarbamyl, N-cycloalkylcarbamyl, alkanoyl, aroyl, aryl, cyano, benzimidazolyl, benzoxazolyl, or benzothiazolyl; and Z is selected from hydrogen, alkoxycarbonyl, aryloxycarbonyl, cycloalkoxycarbonyl, or cyano;

wherein the various alkyl, divalent aliphatic, aryl and cycloalkyl moieties of the Y and Z groups are unsubstituted or substituted with any substituent which does not interfere with a condensation reaction;

at least one of R, $R^1$, Y, and Z is, or forms part of, or contains one or more reactive groups capable of undergoing a condensation reaction under polyester or polycarbonate forming conditions, such that the UV absorbing compound is reacted into the polymer;

in all of the above definitions the alkyl or divalent aliphatic moieties of the various groups contain from 1-10 carbons, straight or branched chain; and wherein said composition has an inherent viscosity of from about 0.4 to about 1.2 determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent.

2. A composition of claim 1 wherein:

R is selected from cycloalkyl; cycloalkyl substituted with one or two of alkyl, alkoxy or halogen; phenyl; phenyl substituted with 1-3 of alkyl, alkoxy, halogen, alkanoylamino, or cyano; straight or branched lower alkenyl; straight or branched alkyl and such alkyl substituted with 1-3 of the following: halogen; cyano; succinimido; glutarimido; phthalimido; phthalimidino; 2-pyrrolidono; cyclohexyl; phenyl; phenyl substituted with alkyl, alkoxy, halogen, cyano, or alkylsulfamonyl; vinylsulfonyl; acrylamido; sulfamyl; benzoylsulfonicimido; alkylsulfonamido; phenylsulfonamido; alkenylcarbonylamino; groups of the formula

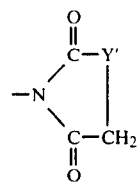

wherein Y' is —NH—,

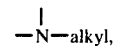

—O—, —S—, or —CH$_2$O—; —S—R$_{14}$; SO$_2$CH$_2$CH$_2$SR$_{14}$; wherein R$_{14}$ is alkyl, phenyl, phenyl substituted with halogen, alkyl, alkoxy, alkanoylamino, or cyano, pyridyl, pyrimidinyl, benzoxazolyl, benzimidazolyl, benzothiazolyl, or a radical of the formulae

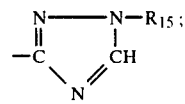

—NHXR$_{16}$; —CONR$_{15}$R$_{15}$; or —SO$_2$NR$_{15}$R$_{15}$; wherein R$_{15}$ is selected from H, aryl, alkyl, or alkyl substituted with halogen, phenoxy, aryl, —CN, cycloalkyl, alkylsulfonyl, alkylthio, or alkoxy; X is —CO—, —COO—, or —SO$_2$—; R$_{16}$ is selected from alkyl or alkyl substituted with halogen, phenoxy, aryl, cyano, cycloalkyl, alkylsulfonyl, alkylthio, or alkoxy; and when X is —CO—, R$_{16}$ is further selected from hydrogen, amino, alkenyl, alkylamino, dialkylamino, arylamino, aryl, or furyl; alkoxy; alkoxy substituted with cyano or alkoxy; phenoxy; or phenoxy substituted with 1-3 of alkyl, alkoxy, or halogen; and wherein the various alkyl, divalent aliphatic, aryl and cycloalkyl moieties of the Y and Z groups are unsubstituted or substituted with 1-3 substituents selected from alkyl, aryl, cycloakyl, alkoxy, halogen, hydroxy, alkoxycarbonyl or cyano;

3. A composition of claim 1 wherein R is alkyl, $R^1$ is hydrogen, Y is alkoxycarbonyl, and Z is cyano.

4. A composition of claim 1 wherein the UV absorbing compound has the structure

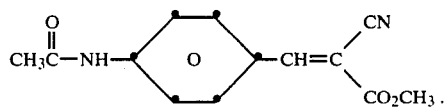

5. A composition of claim 1 wherein the polyester is comprised of an acid moiety and a glycol moiety, said acid moiety being comprised of at least about 50 mol % terephthalic acid residue, and said glycol moiety of at least about 50 mol % ethylene glycol or 1,4-cyclohexanedimethanol residue.

6. A composition of claim 1 having an inherent viscosity of from about 0.65 to about 0.85, wherein the acid moiety is 100 mol % terephthalic acid residue, and the glycol moiety is 100 mol % ethylene glycol residue.

7. A composition of claim 1 having an inherent viscosity of from about 0.65 to about 0.85, wherein the acid moiety is 100 mol % terephthalic acid residue, and the glycol moiety is comprised of from about 65 to about 95 mol % ethylene glycol residue, the remainder being 1,4-cyclohexanedimethanol residue.

8. A formed article of the composition of any one of claims 1-7.

* * * * *